United States Patent [19]
Shalit

[11] Patent Number: 6,113,255
[45] Date of Patent: Sep. 5, 2000

[54] ILLUMINATION SYSTEM USING SUNLIGHT AND A FLEXIBLE LIGHT CONDUCTOR

[76] Inventor: Hanoch Shalit, 245 E. 63rd St. #34B, New York, N.Y. 10021

[21] Appl. No.: 09/241,001

[22] Filed: Feb. 1, 1999

[51] Int. Cl.[7] .................................................. F21S 11/00
[52] U.S. Cl. ......................... 362/576; 362/557; 362/145; 362/234; 362/253
[58] Field of Search .................... 362/551, 552, 362/376, 580, 582, 583, 562, 145, 147, 253, 557, 228, 232, 234

[56] References Cited

U.S. PATENT DOCUMENTS

| | | | |
|---|---|---|---|
| 3,455,622 | 7/1969 | Cooper | 359/359 |
| 4,305,383 | 12/1981 | Bloxsom | 126/643 |
| 4,539,625 | 9/1985 | Bornstein et al. | 362/576 |
| 4,720,170 | 1/1988 | Learn, Jr. | 359/597 |

*Primary Examiner*—Sandra O'Shea
*Assistant Examiner*—Ismael Negron
*Attorney, Agent, or Firm*—Eliot S. Gerber

[57] ABSTRACT

An illuminator system for the interior of buildings provides natural sunlight illumination. The system comprises a sunlight collector mounted on the building's roof, such as a large condenser lens or a reflector, to focus the sunlight at a focal point. A transparent end plate, at the focal point, transmits the condensed sunlight to the exterior end of a thin and flexible optical conductor, such as a polymer core fiber optic cable. The conductor extends through the roof to an exterior room and terminates in a light dispersing illuminator which illuminates the room.

1 Claim, 2 Drawing Sheets

ILLUMINATION SYSTEM USING SUNLIGHT AND A FLEXIBLE LIGHT CONDUCTOR

FIELD OF THE INVENTION

The present invention relates to interior room illumination in a building.

BACKGROUND OF THE INVENTION

The problem of bringing sunlight to illuminate the interior of a building is one of the oldest and most difficult in the history of architecture. The atrium plan, in which a building is constructed around a central open courtyard, was basic in ancient Roman architecture. It consisted of a central opening in the roof ("compluvium") which allowed light into the center of the building. That type of structure, as well as atriums with glass roofs, is still widely used.

Another solution to bringing sunlight indoors is windows, which originally were holes in walls. With the inexpensive manufacture of sheet glass, both vertical windows and skylights (horizontal windows) have become the most common means of bringing sunlight into a building.

However, it often happens that windows do not provide enough natural light, for example, in basements or rooms whose windows are blocked or shaded. Lamps may be needed for reading and general illumination even in daylight hours. In addition, artificial light, generally electric light using special bulbs or phosphors, may approximate the spectral characteristics of natural light. Such lamps are used in the treatment of SAD (Seasonal Affect Disorder) but are not widely used for indoor lighting. The lack of sunlight has been attributed as a cause of seasonal depression, especially in northern countries.

Fiber optics consist of an elongated transparent strand having a core and a cladding, each having a different index of refraction. Light is conducted along its length. Fiber optics is used to conduct light for communications and surgical instruments. It has also been used with a bright bulb, i.e., 400 watt halogen bulb, to bring light to illuminate swimming pools and other environments in which it is difficult to mount an electric light fixture.

U.S. Pat. No. 4,306,769, entitled "Interior Illumination Apparatus Using Sunlight", describes a collector, mounted on a roof, a light pipe and a diffuser. The collector is larger than a cross-section of a hollow light pipe tube having reflective internal walls. However, this system requires a large opening in the roof and a large area for the light pipe. The light pipe is not flexible. A number of these "light pipes" are commercially available from Solatube (TM), Sun Tunnel (TM) and Vista EZ Light (TM) and are promoted as an inexpensive alternative to a skylight. They generally consist of rigid aluminum tubes that fit together; but the Sun Tunnel is a flexible tube somewhat like an oversized clothes-dryer vent.

A number of patents are directed to light guides. For example, U.S. Pat. No. 5,799,124 uses a bulb as its light source and a liquid-filled flexible plastic tube to conduct the light. The light leaks from the light pipe to illuminate a swimming pool.

U.S. Pat. No. 4,957,347 is assigned to Lumenyte International, Costa Mesa, Calif., a manufacturer of illumination plastic optic fiber. That patent describes an optical conduit which emits light along its length. The polymer core, of high refractive index, is surrounded by a heat-shrunk cladding of Teflon (TM of DuPont), i.e., fluorinated ethylene propylene having a low refractive index. Other companies commercially selling fiber optic light guides include Fiberstairs, Fiberoptic Lighting, Prime Light and TPR Enterprises.

SUMMARY OF THE INVENTION

The present invention brings natural sunlight to illuminate any interior part of a building, including basements and otherwise dark rooms. Although the light includes the entire visible spectrum, the IR (infra-red) section of the spectrum may be excluded, especially during the summer period.

The system comprises a collector, a fiber optical light conduit and a diffuser. The collector is positioned on the roof of a building to collect sunlight and direct it to the upper end of the light conduit. In one embodiment the collector is a large convex-convex lens, such as a liquid-filled plastic lens having an IR filter. In another embodiment the collector is a reflector, such as a metal mirror reflector having a spherical profile and a cold mirror coating to reflect visible light and pass IR radiation. The collector concentrates the sunlight and directs it onto a receptor at the upper end of the light conduit; for example, the receptor may be a hollow light pipe or a transparent plate. Preferably the cross-sectional area of the collector is in the range of a ratio of 2:1 to 200:1 compared to the cross-sectional area of the conduit to greatly increase the light intensity.

The conduit is a fiber optic device. In one embodiment it has a solid transparent polymer core and a transparent polymer cladding, each of a different index of refraction, causing total internal reflection (TIR). In another embodiment it has a hollow core filled with a transparent liquid and a polymer transparent tubular cladding. In all cases the light conduit is flexible and preferably less than two inches in outer diameter (OD) so that it may be threaded through the interior of walls. In that way the light pipe may extend from the roof, or any outside area, to any interior room of the building.

At its lower end the light conduit terminates in a light diffuser, for example, a diffuser plate or a bulb-like emitter. Alternatively, the light diffuser (illuminator) may have an expanding lens, i.e., a convex lens, to expand the light and provide a uniform illumination, i.e., window-like appearance. The sunlight diffuser (emitter) may be treated like a light fixture in terms of illumination and decor.

DETAILED DESCRIPTION

Figure 1:
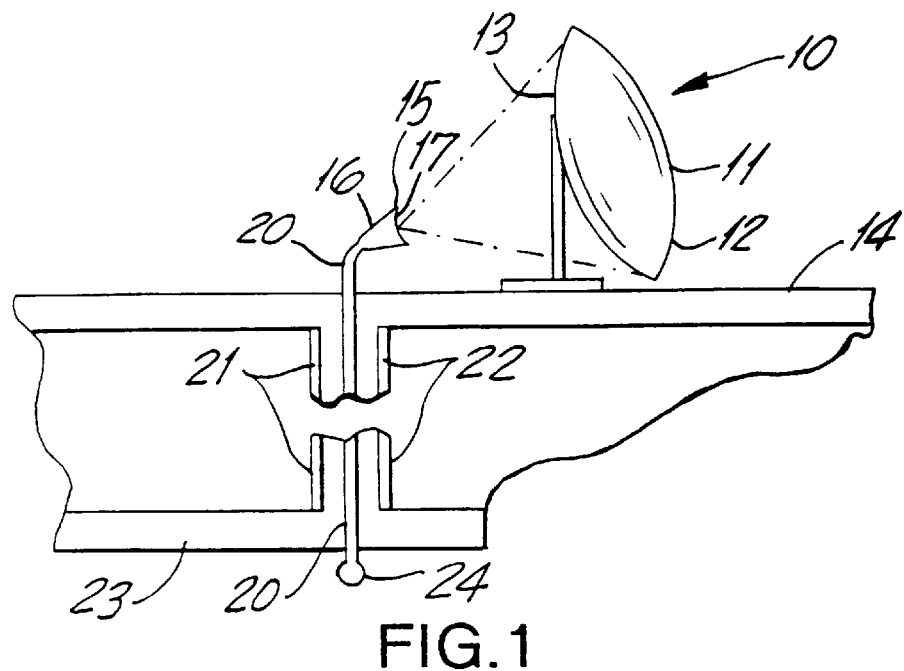
FIG. 1 is a side view, in cross-section, of the first embodiment of the present invention.

As shown in FIG. 1, sunlight is collected by a collector 10, which in one embodiment is a large convex-convex lens. For example, the lens 11 has convex front face 12 and convex back face 13 of a clear plastic resin, such as Lucite (TM of DuPont). The lens is filled with a suitable transparent fluid, such as a mineral oil. This type of lens is relatively low in cost. Alternatively, at greater cost, the lens may be of a suitable transparent solid plastic. Preferably the lens is round (cross-sections perpendicular to its optical axis) and is 1 to 6 feet in diameter. The lens 11 is held upright on the roof 14 of a building and inclined to receive the maximum amount of sunlight. The exact direction toward which the lens points and its angle of inclination to the vertical depends primarily upon the geographic location of the building. For example, in New York City an angle of inclination of about 30 degrees and the lens directed south may be satisfactory. These angles and directions are the same as for a solar collector of a solar water heater system. Alternatively, and not shown, the collector may be mounted on a motor-driven computer controlled platform to follow the sun and to differently incline the collector at different times of the year.

The lens 11 focuses the sun's rays at a focal point 15. A transparent end plate 16 is positioned at the focal point 15. In this embodiment the end plate 16 has an optional concave input face 17 having a "hot mirror" coating. That hot mirror coating reflects infra-red radiation (heat) and passes the visible spectrum of light. Such a coating typically is a multi-layer dielectric coating on heat-resistant glass and reflects 90% of infra-red and passes over 95% of visible spectrum. Preferably the end plate is of heat resistant glass such as borosilicate glass, i.e., Pyrex (TM Corning). The end plate 16 is a light pipe which conducts and funnels the light to the polished exterior end of a light pipe conductor 20. The conductor 20, in this embodiment, is an optical fiber having an inner transparent plastic polymer resin core ¼- to ¾-inch in diameter, a transparent plastic polymer cladding around the core of a lower index of refraction than the core, i.e., Teflon (TM DuPont) for fluorinated ethylene propylene, and an outer plastic protective tubing, such as black PVC (Poly Vinyl Chloride).

The conductor 20 passes through the roof 14 and within the walls 21,22 of the building. It exits, at its interior end, at the ceiling 23, or a wall, of a room of the building.

The conductor 20 terminates at a light diffuser (light diffusion means) 24 which may be shaped as a conventional glass light bulb.

The conductor 20, described above, is available from Lumenyte International, and is called an "illumination plastic optic fiber." It has a single polymer core ¹⁄₁₆–¾ inch surrounded by a heat-shrunk Teflon (TM DuPont) cladding. An alternative light conductor is BRITE PAK (TM) of Fiberstars Corp., which consists of thin fiber optic strands which are grouped in densely packed bundles, twisted and drawn through a PVC (Poly Vinyl Chloride) outer jacket. In each strand the plastic core has a higher refractive index than its cladding, causing internal reflection as the core-cladding boundary. This type of conductor is especially useful for long lengths of over 100 feet.

Another type of conductor 20 is a fluid-filled tube in which a transparent fluid is the optic core and the transparent tube is the cladding. This type may not be suitable for use in long-term construction, due to sealing and aging problems, but may be useful as a low-cost conductor in temporary buildings.

Still another type of conductor 20 is presently experimental. It is a hollow tube having an internal dielectric mirror formed, in the experiment, of nine alternating layers of polystyrene and tellurim (New York Times, Dec. 15, 1998, pg. F2).

In all cases, in the present invention, the outer surface of the collector is at least 2 times, in area, the cross-section of the conductor, e.g., preferably a ratio of at least 20:1. The light is greatly concentrated before it is transmitted by the conductor 20. For example, if the diameter of the lens 11 is 4 feet, its area is 14.7 square inches. A light conductor which is a plastic single core fiber optic having a ½ inch core diameter has a cross-sectional area of about 0.24 inches so the ratio is 60:1. Most preferably that ratio is at least 50:1 and may be considerably higher, i.e., 200:1, if infra-red heat is substantially reduced.

Figure 2:
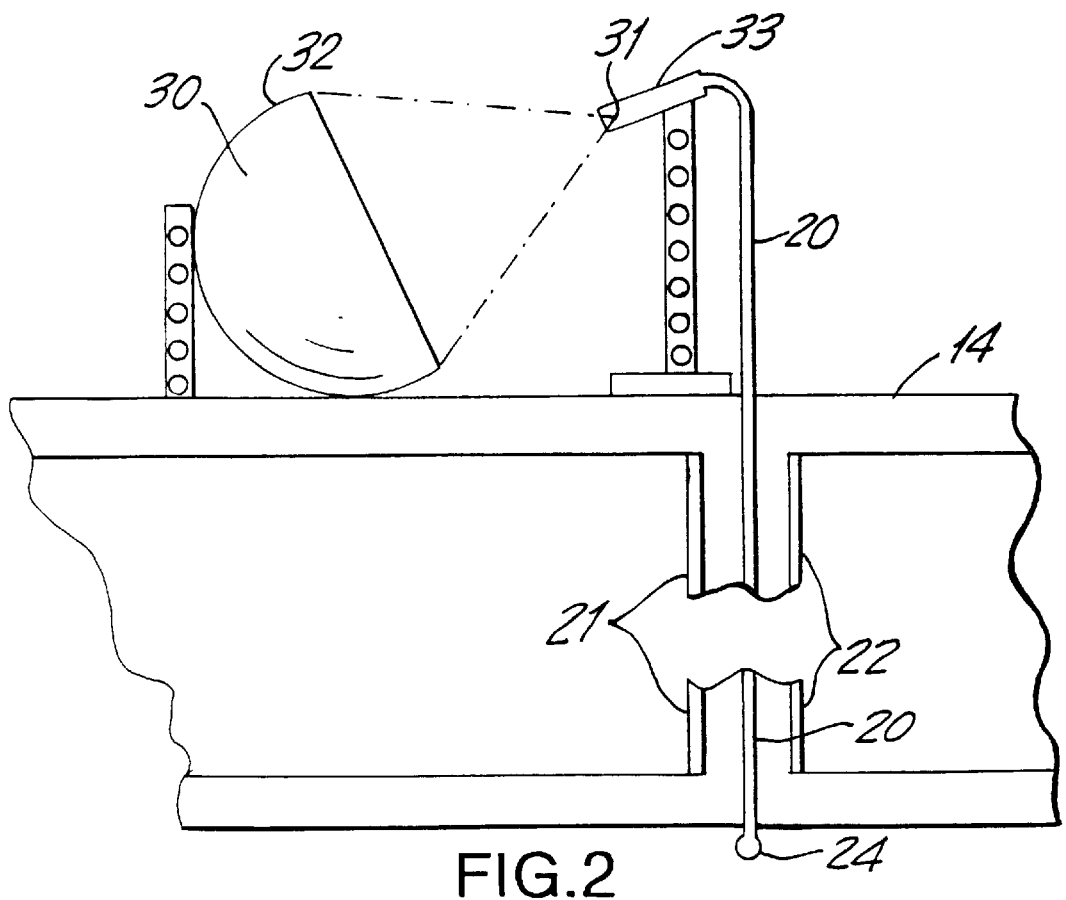
FIG. 2 is a side view, in cross-section, of the second embodiment of the present invention.

An alternative collector is illustrated in FIG. 2. It is a reflecting mirror 30 concentrating the sun's rays to a focal point 31. For example, the mirror's profile is a spherical or parabolic curve (in profile). Preferably it is a metal mirror having a cold mirror coating which passes infra-red into the metal to be dissipated as heat, and reflects the visible spectral band. Such cold mirror coatings typically reflect 90% of visible light and allow over 80% transmission of IR waves, which are dissipated as heat by the reflector. A hollow light pipe 33, rectangular in cross-section, transmits the light to the end of a light conductor 20. The walls of the light pipe 33 are preferably metal having a cold mirror coating to further reduce infra-red radiation.

Alternatively, and not shown, the reflector may be mounted on a platform which, controlled by a microcomputer, rotates the platform to follow the sun and also differently inclines the reflector to follow the seasons.

Figure 3:
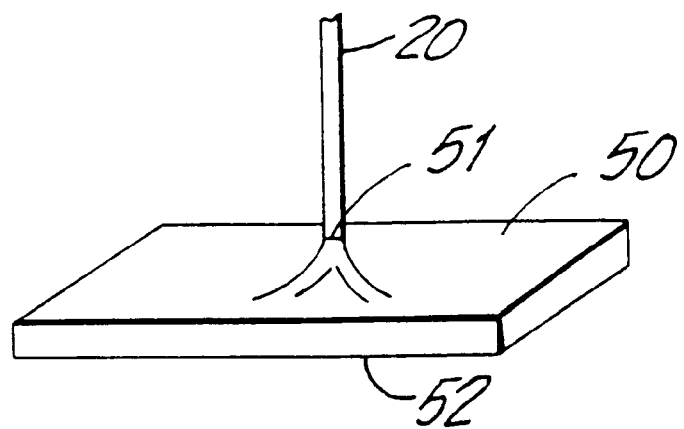
FIG. 3 is a perspective view of an alternative diffuser.

An alternative illuminator (diffuser) is shown in FIG. 3. It is a solid transparent plastic resin plate 50 which acts as a light pipe. It has an inlet end 51 which is connected to the interior end of the conductor 20 and an end plate 52 which looks like a window, if mounted on a wall, or a skylight, if mounted on a ceiling. An alternative illuminator is a lens with a focal point at 51 which would disperse the intense point source to a wider area, i.e., provide a window-like, or skylight-like, appearance.

The present invention provides natural sunlight, with, or without, heat, to interior rooms of a building. It may be retrofitted to existing buildings by threading the conductor 20 through hollow walls of the building. Preferably conductor 20 is flexible. In new construction, the conductor 20 may be laid between walls in the same manner as electrical cable. Generally the collector will be on the roof of a building, but the term "roof" includes any building exterior area, such as a patio, porch, or balcony. For example, the collector may be next to a building and the conductor 20 transmits its collected sunlight to a room above, below or on the same level as the collector.

The collected light is natural sunlight, so the illuminator will not provide any light at night and less light on cloudy days. A filter system at the light input to 20 can provide light of different sections of the electromagnetic spectrum, i.e., with or without heat (IR).

Figure 4:
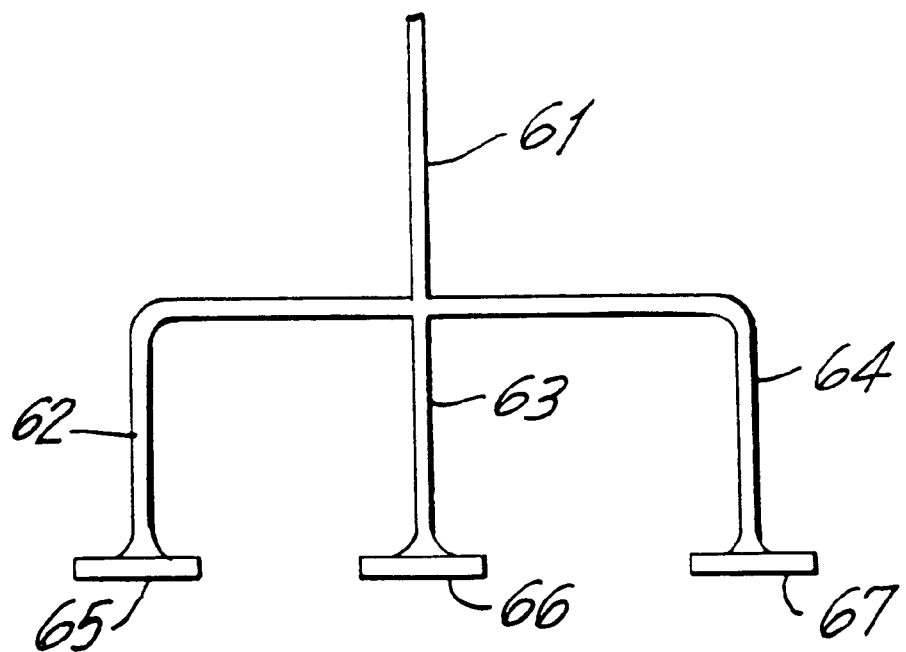
FIG. 4 is a side view of a fiber optic cable with branches.

In the embodiment of FIG. 4 a single collector (not shown) in used to gather and concentrate the sunlight which it transmits to conductor 61. The conductor 61 is branched into a plurality (3 shown) of sub-cables 62–64, each of which terminates in an illuminator (diffuser) 65–67, respectively. In this way, for example, the sunlight may be transmitted to three rooms or to three diffusers in one room. In addition, the top portion of the conductor 20 may have a thicker core, as due to transmission losses along its length the upper part conducts more light than the lower part.

Modifications may be made within the scope of the present invention and claims. For example, an electrical light source, such as a high intensity discharge lamp, may be focused on the exterior end of the light conduction means. The lamp is turned on when the sky is dark to supplement, or replace, the collected sunlight. A sensor (photodetector) measures the sunlight and, if not sufficient, increases the lamp's output in inverse relationship to decreases in sunlight. The interior light may be held constant and the room illuminator will generate light at night. The lamp may be turned on, and off, from a switch within the room.

What is claimed is:

1. A system for the illumination from sunlight of a building having a roof and an interior room, comprising:
(a) collector means mounted on the roof to gather and focus sunlight at a focal point, the collector means having an optical end plate means to receive the sunlight;
(b) a light conduction means having an exterior and an interior end which is an elongated member to conduct the sunlight between said ends; the light conduction means extending from the roof to the interior room, the light conduction means having a minimum cross-sectional area; the ratio of the surface area of the collector means to the light conduction means minimum cross-sectional area being at least 2:1;
(c) focal means at the focal point to transmit light to the exterior end of the light conduction means; and
(d) light illumination means connected at the interior end of the light conduction means and within the interior room to illuminate the interior room with sunlight;
wherein the optical end plate means includes a hollow light pipe and
wherein the light pipe is rectangular in cross-sections and comprised of metal walls having a cold mirror coating thereon.

* * * * *